May 21, 1963    M. W. LEVINE    3,090,920
CAVITY TYPE TUNER
Filed Jan. 12, 1960
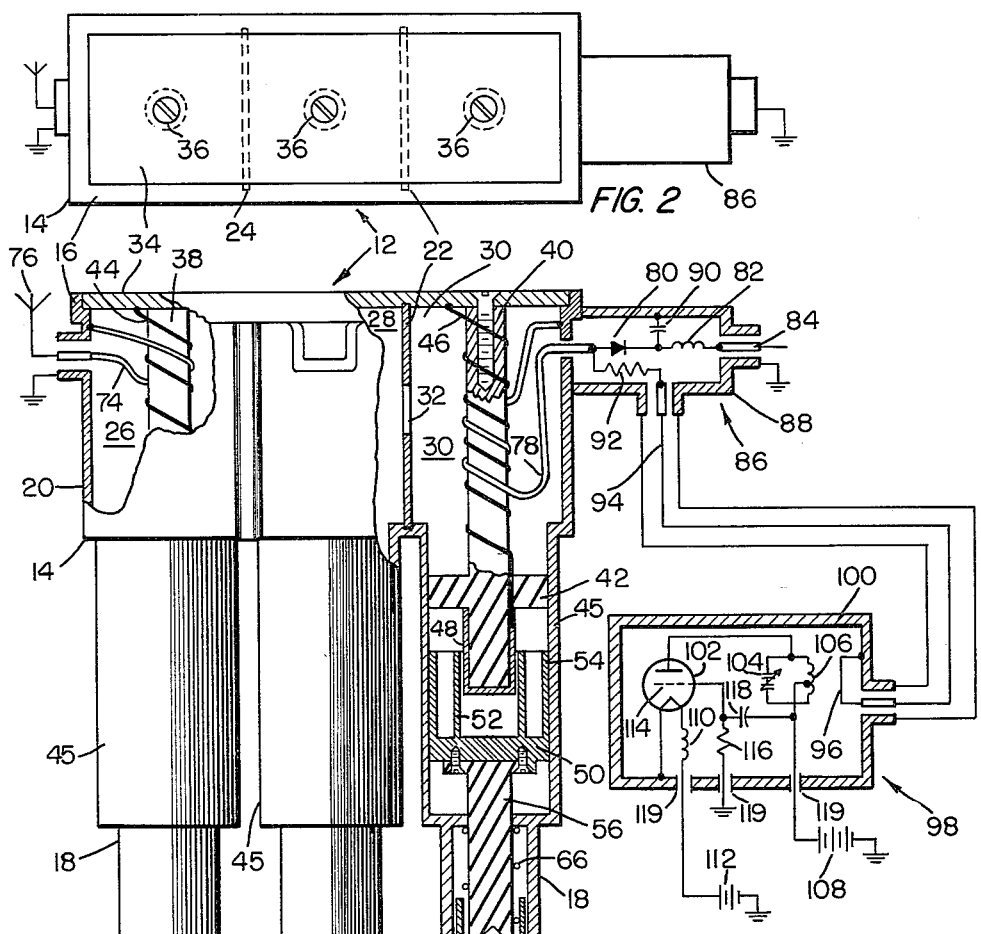
INVENTOR.
MARTIN W. LEVINE
BY *Walter J. Kreske*
ATTORNEY

3,090,920
CAVITY TYPE TUNER
Martin W. Levine, Boston, Mass., assignor to General Electronic Laboratories, Inc., Cambridge, Mass., a corporation of Massachusetts
Filed Jan. 12, 1960, Ser. No. 1,943
7 Claims. (Cl. 325—468)

This invention relates to cavity type tuners and more particularly to improved cavity type tuners wherein physical dimensions of the cavity may be much smaller than a quarter wavelength of the resonant frequency signals therein.

Among the important problems in cavity type tuners are the problems of size, efficiency, selectivity, and reliability of operation. In the problem of size, cavity dimensioning has been an important limiting factor in determining the range of radio frequencies for which the cavity type tuners have heretofore been used. Because it has heretofore been necessary to increase the size of the cavity substantially linearly with increase of the wavelength, cavity type tuners have usually been confined in their application to radio frequencies above 200 mc. In the problem of efficiency of cavity type tuners, an important factor is the resistance loss characteristic due to the inherent structure of the devices heretofore used, and the consequent limitation of the Q factor of the resonant circuit. In the problem of selectivity over the tuner frequency range, particularly, where multiple cavity tuners are involved, proper balance of the capacitive and inductive coupling arrangements between the cavities have presented serious limitations. In the problem of reliability of operation, an important factor is the contact relation of moving components with respect to each other. All of these factors are in varying degrees, interdependent and important to proper operation of cavity type tuners.

Pursuant to the present invention, an improved cavity type tuner arrangement has been devised wherein these problems of size, efficiency, selectivity, and reliability have been overcome to produce an optimum operating arrangement. For example, structural cavity dimensioning heretofore required for 200 mc. operation is now useable for frequencies down to 70 mc. operation. Bandwidth vs. frequency response achieved, is substantially linear over the operating range of the tuner. Energy dissipation through resistive losses have been minimized.

Accordingly, a primary object of the present invention is the provision of a cavity type tuner capable of internal cavity dimensions substantially smaller than one quarter wavelength of the operating frequency therein.

Another object is the provision of an improved cavity type tuner having capacity for operation with frequencies as low as 70 mc.

And a further object is the provision of an improved cavity type tuner having a substantially linear response over the operating range of the tuner.

And a further object is a provision of a cavity type tuner with a low energy dissipation through resistive losses and with a high Q characteristic.

A further object is the provision of an improved cavity type tuner suitable for multiple cavity operation with proper balance of capacitive and inductive coupling arrangements therebetween and which is rugged in its construction and reliable in its operation.

These and other objects, features and advantages are achieved generally by providing a housing of electrically conductive material forming a resonator cavity having two ends, a conductor extending inwardly of the cavity from one of the ends and electrically anchored to the housing at the one end, an electrically conductive element in the cavity mounted to be moved from the other end to vary the capacitive relation between the element and the conductor.

By making the conductor in the form of a helical coil, cavity dimensions substantially smaller than ¼ of the wavelength of the operating frequency is thereby achieved.

By providing a support member of dielectric material extending inwardly of the cavity to support the helical coil, ruggedness of construction and reliability of operation is thereby enhanced.

By electrically terminating the helical coil is an electrically conductive cap on the end of the dielectric support member, increase of capacitive relation for the electrically conductive element with resulting increase in tuning range is thereby achieved.

By making the electrically conductive cap in the form of a cylinder and the electrically conductive element also cyindrical in shape with capability for enveloping the cap, increased breadth of capacitive adjustments and thereby tuning adjustments is thereby achieved.

These and other features, objects and advantages will become more apparent from the following description taken in connection with the accompanying drawings of a preferred embodiment of the invention and wherein:

FIG. 1 is a partially schematic and partially cutaway assembly view of a receiver front end with a cavity type tuner made in accordance with the present invention;

FIG. 2 is a top view of the cavity type tuner shown in FIG. 1;

FIG. 3 is a graph to more clearly show operation of the embodiment shown in FIG. 1.

Referring to FIG. 1 in more detail, a receiver front end made in accordance with the present invention is designated generally by the number 10. This receiver front end 10 has, in this instance, a triple cavity, preselector 12 made of an electrically conductive material such as copper, brass or aluminum. The triple cavity preselector 12 has a housing 14 having two ends 16 and 18 which together with side walls 20 and aperture plates 22 and 24 define three resonator cavities 26, 28, and 30. Each of the aperture plates 22 and 24 has an aperture such as the aperture 32 in the plate 22 and has a position and size for maximum coupling between adjacent cavities. The plates 22 and 24 slide in the mating grooves in the housing 14 for proper location and assembly. The internal surfaces of the housing 14 are preferably silver plated for stabilizing and improving electrical characteristics.

A closure plate 34 at the end 16 of the triple cavity preselector 12 has fixed thereto, as by screws 36, cylindrical support rods such as the cylindrical support rod 38 in the cavity 26 and the cylindrical support rod 40 in the cavity 30 and which extend inwardly and coaxially of the respective cavities from the end 16 of the housing 14. The cylindrical support rods 38 and 40 are preferably made of such dielectric material as Teflon and each has a circumferential shoulder, such as the shoulder 42, making engagement with the internal surface of the cylindrical sleeve portions 44 of the housing 14 at the respective cavities 30, 28 and 26. Each of the cylindrical support rods, such as the rods 38 and 40 carry an electrically conductive cable helically wound thereon such as the copper cables 44 and 46 respectively, each being electrically anchored at one end on the closure plate 34. Each of the dielectric support rods 40 carries a cap or ferrule of electrically conductive material, such as cap or ferrule 48, to which is electrically anchored the other end of the helically wound cable which in the case of the resonator cavity 30 is the cable 46.

An open ended tuning cylinder 50 is slidably arranged in the cylindrical portion 45 of the housing 14 so as to ride over and envelop the cap 48 so as to selectively vary the electrical capacitance therebetween to vary the effective length of the cable 46.

The internal surface of the cylinder 50 is preferably coated with a thin coating 52 of insulating material such as Teflon to prevent electrical contact between the cap 48 and the cylinder 50. Similarly, the outer surface of the cylinder 50 is provided with a thin coating 54 of dielectric material such as Teflon to prevent electrical contact between the cylinder 50 and the cylindrical portion 45 of the housing 14. The cylinder 50 is fixed to the end of a cylindrical rod 56 of dielectric material such as Lucite or Teflon which extends axially from the end 18 of the housing 14 and carries a cam follower 58 in its end riding on a cam 60 fixed to a shaft 62 held in bearings 64 for operation as will be hereinafter further described.

The dielectric rod 56 and tuning cylinder 50 with the cam follower 58 are yieldably held against the cam 60 by a spring 66 compressed against a radiation shield and retainer cylinder 68 which is held in place against the end of the adjusting rod 56 by an insulating washer 70 and screw 72.

A loop 74 of conductive material about the support rod 38 and terminating at one end on the housing 14 and at the other end in an antenna 76, provides the antenna signal input to the cavity 26. Another loop 78, of conductive material, about the dielectric support rod 40 has one end electrically anchored to the housing 14 and the other end connected through a diode 80 and an inductive coil 82 to an output center conductor 84 in a mixer circuit 86. The mixer circuit 86 is in a conductive housing 88 fixed to the housing 14 of the triple cavity preselector 12. The mixer circuit 86 has a capacitor 90 coupled between the housing 88 and the common point between the diode 80 and inductive coil 82. The mixer circuit 86 is also fed through a resistor 92 coupled between the diode 80 and a center conductor 94 connected to a coupling loop 96 in a local oscillator circuit 98. The other end of the coupling loop 96 is electrically connected to the oscillator housing 100 which contains a triode 102, the plate circuit of which is coupled to a variable capacitor 104 in parallel with an inductance 106, the center tap of which is coupled to the positive terminal of a power source such as a battery 108 having a negative terminal coupled to ground. The cathode of the triode 102 is coupled at one end to the housing 100 and at the other end through an inductance 110 to the positive terminal of a power source such as the battery 112 having its negative terminal coupled to ground. The grid 114 of the triode 102 is coupled through a resistor 116 to ground and through a capacitor 118 to the center tap on the inductance 106. To minimize escape radiation, feed through capacitors 119 are provided for cables passing through the housing 100.

In the operation of the receiver front end 10, electromagnetic signals are picked up by the antenna 76 and fed to the preselector 12 by the coupling loop 74 in the first cavity 26 which is tuned to the signal frequency by rotating the shaft 62 until cams 60 cause the followers 58 to move the tuning cylinders 50 over the cap 48 to simultaneously tune the three cavities 26, 28 and 30 to resonance for the desired incoming frequency. The output from the cavity 30 is fed to the mixer circuit 86 by the loop 78. Simultaneously, a signal from the local oscillator 98 is fed through the resistor 92 to the mixer circuit 86 to beat with the output from the loop 78 to provide an intermediate frequency signal component at the output 84 to an intermediate frequency amplifier and subsequent receiver circuits (not shown). The uniform sensitivity of this invention over the frequency range of operation is shown by the curve 120 in FIG. 3 where the sensitivity is defined as $$\frac{S+N}{N}$$

S being the signal intensity and N being the noise intensity.

To a first approximation, the helical lines such as 44 and 46 resonate when the length of the wire in the helix equals a quarter wavelength. This coil may be considered as a spiral delay line with a velocity of propagation very much smaller than that of free space. The guide wavelength in such a transmission line is $\lambda_g = v/f$, where $f$ is the frequency of measurement and $v$ is the velocity of propagation and $\lambda_e$ is the guide wavelength. As $v$ is decreased, the guide wavelength decreases for a given frequency. Therefore, a quarter wavelength resonator may be constructed which is physically much shorter than a resonator operating in the TEM mode. The velocity of propagation can be calculated from standard delay line considerations; it is only necessary to know the inductance and capacitance of the line per unit length. The helical lines, such as 44 and 46, are tuned capacitively by means of the cap 48 and open cylinder 50 to avoid metal-to-metal sliding contacts. The cap 48 and cylinder 50 varies the capacity between the open end or high voltage end of the quarter wavelength line 46 and the outer tuning cylinder 50. The capacity is at a maximum when the tuning cylinder 50 is fully inserted and envelops the cap 48, thus tuning the resonator to its lowest frequency. As the cylinder 50 is withdrawn, the capacity between the helical line 46 and outer conductor 50 is reduced and the resonant frequency increases. The three cavities 26, 28, 30 are simultaneously tuned in the same manner to the same frequency. They are coupled by means of simple apertures such as the aperture 32 which has a size and location arranged for optimum bandwidth and bandshape over the tuning range.

By increasing the number of tuning cavities, greater rejection of image and spurious signals is effected. Thus, for example, where an intermediate frequency of 42 mc. is desired over an input frequency of 500 to 1000 mc., the three cavity preselector 12 shown in the illustrative embodiment is desired for achieving the necessary image rejection. Whereas an intermediate frequency of 10.9 mc. and an operating range of 70 to 200 mc. input signal, a two cavity tuner may be all that is needed to obtain the desired image rejection and selectivity. The greater the number of tuned cavities the greater will be the selectivity.

Also, while in the frequency range of 70 to 200 mc., helically a wound cable such as cable 46 will be found to permit a reduction in size of cavity to make the preselector of a reasonable physical size, for frequencies over 200 mc., a single straight conductor capacitively tuned in the same manner as explained above may be used without requiring an excessively large physical dimensioning.

What is claimed is:

1. In a cavity type tuner, the combination of a housing of electrically conductive material to form a resonator cavity having two ends, a fixed support member of dielectric material extending inwardly of the cavity with respect to one of the ends, a conductor electrically grounded on the housing and wound about said fixed support member, an electrically conductive element in the form of a cylindrical tube mounted in the cavity for movement from the other end in a direction to circumscribe the conductor, and insulating means between said tube and housing and between said tube and conductor to prevent electrical engagement therebetween.

2. In a cavity type tuner, the combination of a housing of electrically conductive material to form a resonator cavity having two ends, a support member of dielectric material extending inwardly of the cavity with respect to one of the ends, a conductor electrically grounded on the housing and wound about said support member and terminating in a cylindrical electrically conductive cap supported by said dielectric support member, an electrically conductive element in the form of a cylindrical tube mounted in the cavity for movement from the other end in a direction to circumscribe the cap, and insulating means between said tube and housing and between said tube and cap to prevent electrical engagement therebetween.

3. In a cavity type tuner, the combination of a housing of electrically conductive material to form an elongated resonator cavity about an axis and having two ends, a cylindrical support member of dielectric material rigidly fixed to one of said ends and having an axis substantially coincident with said housing axis, an electrically conductive cap on said support member, an electric conductor cable helically wound on said dielectric support member from a position of electrical grounding on the housing to a position of electrical engagement with said cap, an electrically conductive element in the cavity mounted to be moved from the other end to vary the capacitive relation between the element and cap, and insulating means between the element and the housing and between the element and the cap to prevent electrical engagement therebetween.

4. The combination as in claim 1 having additionally a mixer circuit inductively coupled to the conductor by an inductive loop about said support member in said cavity and an oscillator circuit coupled to the mixer circuit.

5. A set of two structures as provided in claim 1, said structures being coupled together with a common wall carrying a coupling aperture therein, said structures being arranged for operation at the same frequency.

6. A set of three structures as provided in claim 1, said structures being coupled together in a row with said adjoining pairs having a common wall carrying a coupling aperture therein, each of said structures being arranged for operation at the same frequency.

7. In a cavity type tuner, the combination of a housing of electrically conductive material forming a resonator cavity having two ends, a helical cable of electrically conductive material extending inwardly of the cavity from one of the ends and electrically grounded on the housing at said one end, the conductive cable being of a length approximately one quarter wavelength of the frequency of selected operation, a first electrically capacitive element electrically coupled to the cable in the cavity inwardly of the grounded portion, a second electrically capacitive element in the cavity mounted to move from the other end of the housing to vary the capacitive relation with the first capacitive element, and means insulating the second capacitive element from the housing and from the first capacitive element to prevent electrical engagement therewith.

References Cited in the file of this patent

UNITED STATES PATENTS

| | | |
|---|---|---|
| 2,103,515 | Conklin et al. | Dec. 28, 1937 |
| 2,489,433 | Rambo | Nov. 29, 1949 |
| 2,641,708 | Carlson | June 9, 1953 |
| 2,758,285 | Le Vine | Aug. 7, 1956 |
| 2,774,044 | Silvery et al. | Dec. 11, 1956 |
| 2,780,727 | Dreyer | Feb. 5, 1957 |
| 2,860,248 | Lyman | Nov. 11, 1958 |
| 2,862,191 | MacDonald et al. | Nov. 25, 1958 |
| 2,885,583 | Cook | May 5, 1959 |

FOREIGN PATENTS

| | | |
|---|---|---|
| 1,049,282 | France | Dec. 29, 1953 |